Jan. 1, 1929.  
C. L. COLBERT  
1,697,556  
DRYING METHOD AND APPARATUS  
Filed March 16, 1927    3 Sheets-Sheet 2

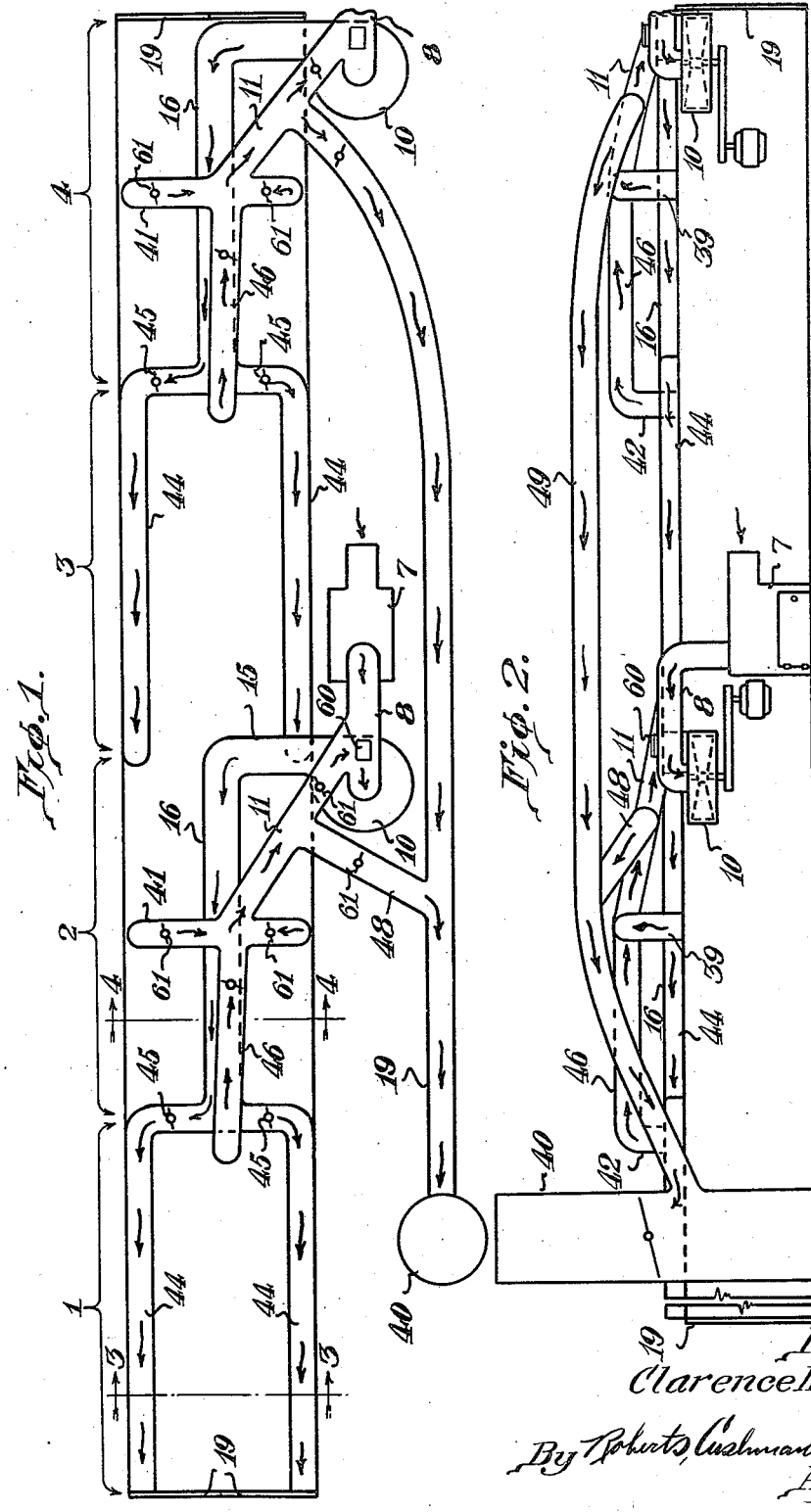

Inventor  
Clarence L. Colbert  
By Roberts Cushman & Woolbury  
Attorneys

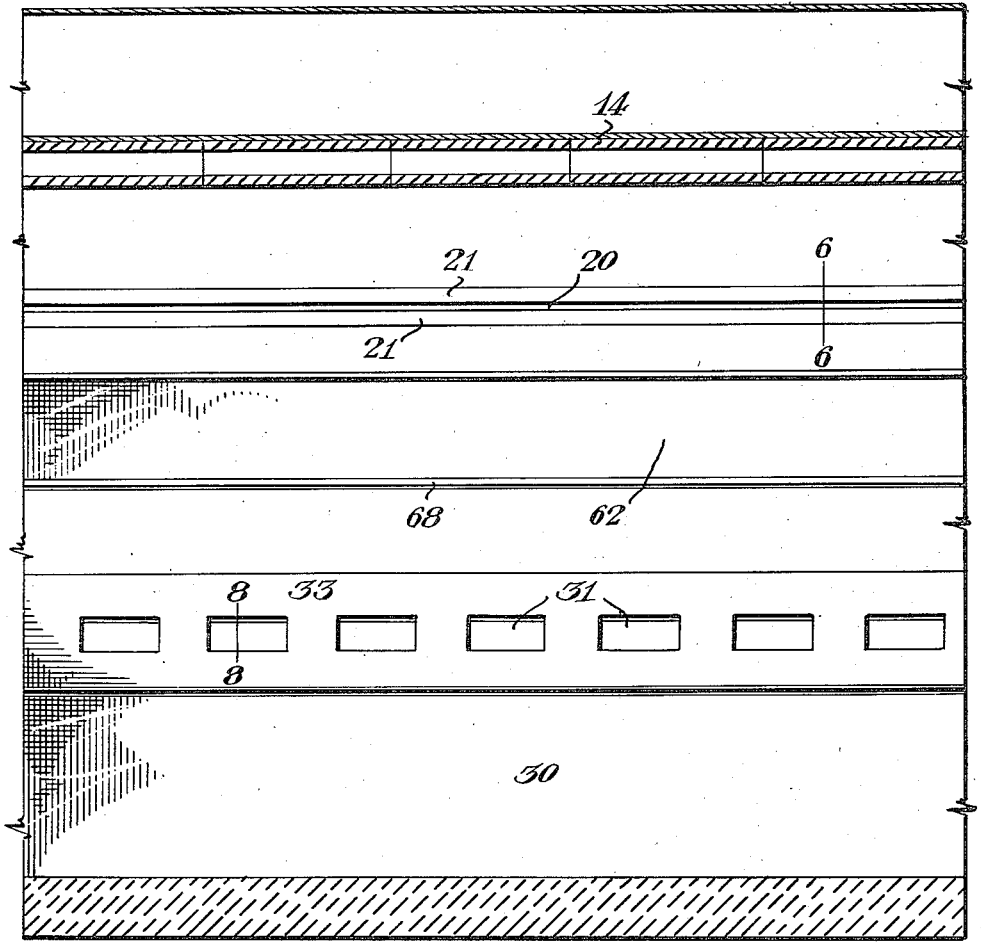
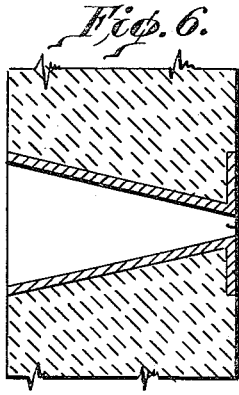
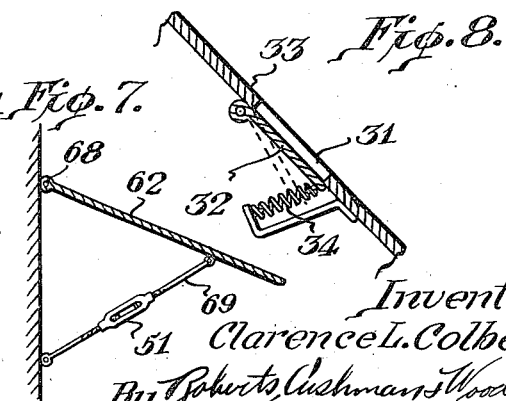

Patented Jan. 1, 1929.

1,697,556

UNITED STATES PATENT OFFICE.

CLARENCE L. COLBERT, OF ELIZABETH, NEW JERSEY, ASSIGNOR TO FISKE & COMPANY, INC., OF BOSTON, MASSACHUSETTS, A CORPORATION OF MASSACHUSETTS.

DRYING METHOD AND APPARATUS.

Application filed March 16, 1927. Serial No. 175,726.

This invention relates to an improved method of drying ceramic ware and to an improved form of tunnel dryer which is adapted efficiently to perform this process.

This process permits rapid, uniform and effective removal of the water of plasticity from ceramic material such as brick, tile, pipe dishware and the like, which may be disposed upon any suitable supporting means that permits a fairly effective circulation of drying air about the major portion of the surface of the ceramic articles. For example the ware may conveniently be located upon moving conveyors which pass through a suitable drying tunnel. Conveyors of this type may be cars of particular design having racks or pallets to support the individual pieces of material, or conveyor belts, cables, chains, gravity conveyors, or overhead trolleys with suitable cooperating equipment.

The preferred aspect of the invention involves the use of a drying tunnel in which drying air is alternately directed upon opposite sides of the ceramic ware which is being conveyed through the tunnel, so that more rapid and uniform drying of the ware is effected and so that there is little danger of cracking due to the distortion caused by uneven drying. Preferably the tunnel and connecting ducts and flues therefor are arranged so that dry heated air is mixed with a determinable proportion of moisture laden air and the resulting air mixture circulated through the tunnel to dry the ware; thus the percentage of moisture in the drying air may be properly controlled so that too rapid drying of any portion of the ware is avoided.

Preferably air circulation is effected through air inlet means which may be in the form of longitudinal slots of nozzle-like section, so disposed that the drying air is given a transverse circulatory motion within the tunnel; suitable baffles being located adjoining the walls of the tunnel to set up eddy currents or secondary drafts in order to insure thorough air circulation throughout all parts of the tunnel. The air inlets in adjoining tunnel sections are located at opposite sides of the tunnel so that the direction of air circulation is reversed as the ware passes through the tunnel, thus avoiding excessive drying of one side of the ware in comparison to the other side therof.

Suitable outlet vents are arranged adjoining the wall of the tunnel to permit outflow of moisture laden air as soon as the pressure of the circulating air has built up to a desired point within the tunnel. A part of the moist air may be mixed with heated drying air which enters the inlet slots of the tunnel, the remainder of the moist air preferably passing to a stack which aids circulation thereof. Suitable dampers and draft control appliances are provided in order to permit the air flow in this manner and to permit, if desired, the introduction of a quantity of atmospheric air into the stream of drying air before it reaches the inlet slots. In order to afford a suitable quantity of dried and heated air for the inlet slots, one or more heating furnaces are provided which may receive atmospheric air and heat the same, or, in the case of many establishments manufacturing ceramic ware, may receive heated air which comes from the burning tunnel or kiln.

The above and further advantageous features and objects of the invention will be apparent to those skilled in the art upon a reading of the subjoined description and claims, in conjunction with the accompanying drawings, in which:—

Fig. 1 is a top diagrammatic view of one portion of the improved drying apparatus used for the improved drying method;

Fig. 2 is a side elevational view of the same, the relation of the various parts and accessories of the tunnel being digrammatically indicated;

Fig. 5 is a section on line 5—5 of Fig. 3, showing the side wall of the tunnel in elevation;

Fig. 6 is an enlarged sectional detail of one of the air outlets taken on line 6—6 of Fig. 5;

Fig. 7 is a sectional detail showing the baffle plate mounting;

Fig. 8 is an enlarged section on line 8—8 of Fig. 5 showing the relief damper in operative position.

Figure 3:
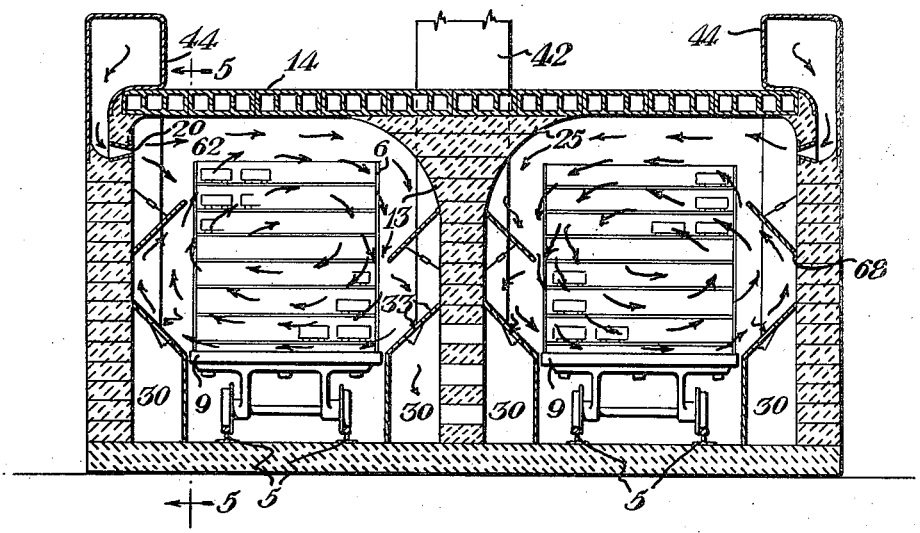
Fig. 3 is a transverse sectional view of the drying tunnel, indicated by line 3—3 of Fig. 1.

While the drying method which is disclosed herein may be performed in various forms of dryers, for the purpose of illustrating the invention in the accompanying drawings, I have disclosed a tunnel dryer comprising a pair of similar tunnels which are joined by a common wall 13 and each of which is divided into four drying sections 1, 2, 3 and 4 respectively, although obviously the number of tunnels and the number of drying sections therein may be varied to suit individual conditions. For purposes of clearness the general arrangement of the ducts, flues and various accessories of the dryer is diagrammatically shown in Figs. 1 and 2, it being understood that in practice the various component factors are more compactly grouped above and about the tunnel dryer.

This dryer may conveniently be formed of brick or similar material, the roof portion thereof being made of hollow tile 14 in order to provide better heat insulation. Longitudinal tracks 5 extend through the tunnels and are adapted to receive cars 6. Each of these cars preferably is provided with slatted racks upon which spaced bricks or other articles to be dried may be located in order to permit fairly free air circulation therebetween, while the lower platform 9 of each car is solid for purposes which will presently be described. The tunnels are preferably provided with inlet and exit doors 19 which are adapted to be closed in order substantially to prevent longitudinal air flow into or out of the tunnel, while these doors are adapted to be opened to permit the removal of a car bearing dried ware at the exit end of the tunnel, and to permit entrance of a car bearing ware to be dried at the opposite end of the tunnel.

Heated air for drying the ware may be received from any suitable source, for example directly from the cooling zone of a burning kiln, or from one or more furnaces which receive atmospheric air or from any suitable source. For example in the present instance warm air is heated by furnaces, one of these furnaces is designated by numeral 7 (Fig. 1) and is designed to supply tunnel sections 1 and 2 with drying air, another similar furnace (not shown) being in a corresponding relation to tunnel sections 3 and 4.

Each furnace is provided with an outlet flue 8 for heated air, Figs. 1 and 2. Each flue 8 is adapted to carry air to suitable draft inducing mechanism 10 such as a fan, blower or the like. A suitable quantity of moisture laden air is also admitted to the passage 8 by the flue 11 which is adapted to receive air in manner which will presently be described. The mixture of heated and moisture laden air passes from factor 10 through the transverse passage 15 into the longitudinal air duct 16 which extends along the center of the dryer as shown more particularly in Figs. 3 and 4. Central ducts of this character are adapted to vent air into the inner sides of alternate tunnel sections 2 and 4, as indicated in Fig. 4. For this purpose I may provide a longitudinal slot 20 in the brick wall of each section, the masonry being held in place by the metal angle members 21, the legs of each angle being at an acute angle to each other to provide the slots with a converging nozzle-like cross-section which aids the desired air circulation, (Fig. 6). Preferably slots 20 are located adjoining the upper part of each tunnel section, the opposite upper corners of which have curved inner surfaces 25, so that little or no pocketing of the air occurs. Ducts 16 have parallel extensions 44 which extend along the outer portions of the dryer, for supplying tunnel sections 1 and 3 with drying air; slots 20 being arranged at the outer sides of these tunnel sections, as disclosed in Fig. 3, so that the air circulation therein is in a direction opposite to that in the adjoining sections.

Figure 4:
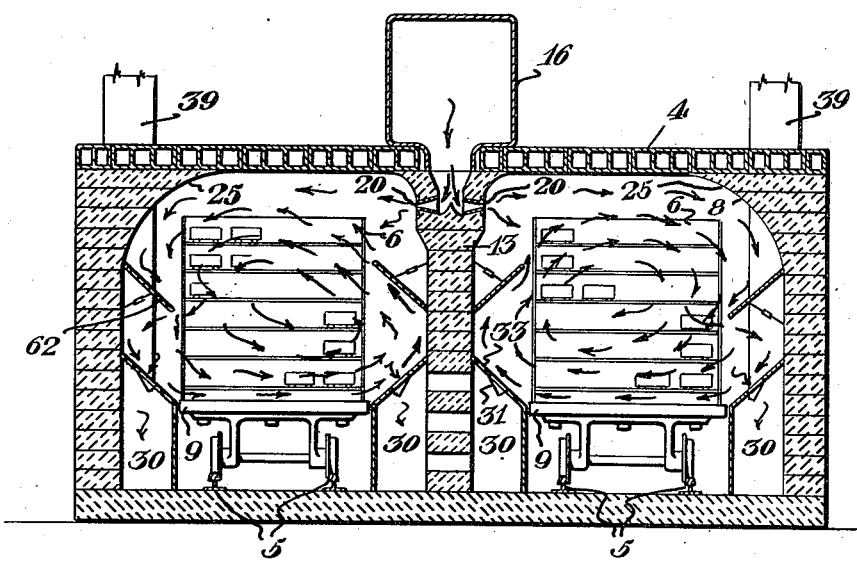
Fig. 4 is a similar view indicated by line 4—4 of Fig. 1.

The outlet ducts 30, Figs. 3 and 4, are closely juxtaposed to the car platforms 9 in order to cooperate therewith in impeding circulation of drying air into the space about the running gear of the cars. Outlet ducts 30 extend longitudinally of the tunnel sections adjoining the lower corners of either side thereof, and preferably are provided with downwardly and inwardly inclined upper surfaces 33 whereby pocketing of the air is substantially prevented. Preferably the brick of the lower part of wall 13 between adjoining outlet ducts 30 is arranged in the form of checkerwork to provide air passages between these outlet ducts. Outlet vents 31 are located at appropriate intervals in the tops of ducts 30. Preferably each of these outlet vents is normally closed by the hinged closure or relief damper 32. Fig. 8 illustrates in detail the arrangement of such a relief damper which may conveniently have its upper end pivoted to the lower surface of member 33, and which may normally be held in closed position by spring 34 so that air will not be exhausted from the adjoining tunnel section until the air pressure has slightly built up within the same.

Suitable outlet flues 39 are located adjoining the the outer walls of the tunnel sections as shown in Fig. 4, and are adapted to conduct air upwardly to the transverse duct 41, Fig. 1. The central outlet ducts 30 are provided with an upwardly extending flue 42 which has a longitudinal extension 46, Fig. 1, that joins the transverse passage 41, this passage being connected with the draft inducting factor 10 by the ducts 11 and 8 in the manner described above.

Ducts 11 are connected by suitable passages 48 and 49 with an upwardly extending stack 40. Suitable dampers are provided in the flues 11 and 48 and in the stack 40 in order to vary the proportion of moisture laden air which is delivered to the draft inducing factor 10, and to the stack. Also the damper within the flue 40 permits a slight back pressure in the exhausted air in order to aid its flow into the factor 10. Dampers 61 may be located adjoining either end of the transverse duct 41 to shut off air flow from either tunnel, such a feature being advantageous when only one tunnel of the pair is being used. Similarly each of the outer drying air ducts 44 may be shut off from the rest of the system by a damper 45. If desired a suitable inlet damper 60 may be provided in the passage 8 in order to permit introduction of atmospheric air into the air mixture which is passing to the blower 10.

In order to provide more uniform circulatory movement of the air in the drying tunnel sections, I provide angularly disposed baffles 62 which are secured to the side walls of the tunnel sections and are inclined in opposite directions at opposite sides of the tunnel, these baffles preferably being arranged with their outer edges spaced a short distance from the ware being conveyed through the tunnel so that a portion of the circulating air will tend to flow inwardly on account of striking the angularly disposed baffle and a portion thereof will pass by the end of the baffle in order to dry the ware beyond the same. The inner edges of the baffles may preferably be pivotally mounted as designated by numerals 68 and they may be retained in adjusted position by links 69 comprising turnbuckles 51.

Thus, referring, for example, more particularly to the right hand tunnel disclosed in Figure 3, it is obvious that air is admitted at the inlet 20 at the upper right hand corner of the tunnel as viewed in this figure. The drying air enters in substantially a tangential direction, flows toward the curved corner 25 and passes downwardly adjoining the opposite side of car 6, whereupon it strikes against the downwardly and inwardly inclined baffle 62 so that a portion of the air passes around the ware in the central portion of the car and so that a portion thereof passes downwardly about the ware in the lower part of the car. Thus a general transverse movement is given to the air which again passes upwardly being guided through the ware by the upwardly and inwardly inclined baffles 62 at the opposite side of the tunnel as indicated by the arrows of Fig. 3.

A drying tunnel of this character permits the improved method of drying which forms one aspect of the present invention. Cars loaded with wet ware enter section 1 of each tunnel and leave section 4 thereof, cars of dried ware being removed at intervals from the outlet of each tunnel and cars of fresh wet ware being introduced into the other end thereof so that the successive cars move gradually through the tunnel. It is to be understood that air enters adjoining sections of the tunnel at opposite sides thereof so that the general transverse and whirling motion of the air is in opposite directions in adjoining tunnel sections. This results in the drying of first one side and then the other side of the ware to a slightly greater extent, but prevents excessive drying of one side in contrast to the other side, and thus avoids cracking or distortion of the ware.

Furthermore, the provision of a suitable percentage of moisture laden air, as for example 75% by volume of moisture laden air mixed with 25% by volume of heated dried air, prevents too rapid drying of the ceramic material. This results in the gradual yet rather rapid absorption of moisture from the surface of the material and the heating of the same so that moisture gradually passes from the center of the brick or other article being dried to the air-swept surface of the same. However, if any local portion of that surface tends to become excessively dried in relation to the remainder of the body, it absorbs sufficient moisture from the incoming air to avoid cracking. Obviously the temperature of the air supplied to tunnel zones 3 and 4 may be somewhat higher than that of the air supplied to the other sections, while the percentage of moisture received by the air from the ware in these sections is somewhat less. Thus assuming that a similar percentage of moist air is mixed with the heated air in each case, the percentage of moisture in the drying air mixture will be less in the later tunnel sections, while the drying air is somewhat warmer in either case when it enters the central ducts 16 than when it has passed to the ducts 44, thus the temperature and humidity of the drying air may be regulated properly to conform to conditions of the ware in each zone; higher temperature and lower humidity being progressively conducive to efficient and satisfactory drying as the amount of water of plasticity in the ware is reduced.

I claim:

1. A drying tunnel comprising a plurality of drying sections means for conveying material through the tunnel, means for inducing a draft of drying air and for heating the same, and inlet means adapted to emit said drying air into the tunnel close to one inner surface of the same, and in a direction substantially transverse to the path of the material upon the conveyor means, the inlet means being located in different parts of adjoining tunnel sections and outlet vents disposed along the tunnel, whereby a substantially transverse, rotary air movement is set up in opposite directions in different tunnel sections.

2. A drying tunnel comprising means for conveying ware longitudinally therethrough, longitudinally disposed air inlet openings, said openings being located at opposite sides of the tunnel in adjoining sections thereof, and inclined baffles projecting into the tunnel and adapted to guide the air flow about the ware carried by the conveyor means.

3. A drying tunnel comprising cars for conveying ware longitudinally therethrough, longitudinally disposed air inlet slots, said slots being located near the upper part of the tunnel and at opposite sides in adjoining sections thereof, longitudinally disposed air outlets adjoining the lower part of the tunnel and inclined baffles projecting into the tunnels with their inner edges disposed near the cars, said baffles being downwardly inclined at portions of the tunnel opposite said slots and being upwardly inclined at portions of the tunnel below said slots, whereby the air in adjoining tunnel sections is circulated in opposite directions and suitable directed about the ware upon all parts of the cars.

4. A drying tunnel comprising means for conveying ware therethrough, drying air inlet slots in said tunnel, said slots being longitudinally arranged at opposite sides of adjoining tunnel sections, the walls of each slot being inclined toward each other so that the slot is of smaller cross-section at the point where air enters the tunnel, corner portions of the tunnel being shaped to avoid pocketing of the air flowing from said inlet slots.

5. A drying tunnel comprising means for conveying ware therethrough, air inlet means disposed along the tunnel, said means being arranged to permit the air to flow transversely along the top of the tunnel, the wall of the tunnel between its top and side being inclined to aid a stream-line circulatory movement of the air, and a downwardly inclined baffle upon the tunnel wall to deflect circulating air toward the ware.

6. A drying tunnel comprising means for conveying ware therethrough, air inlet means disposed along the tunnel, said means being arranged to permit the air to flow transversely along the top of the tunnel, the top of the tunnel being gradually merged into the adjoining wall to permit a stream-line circulatory movement of the air, and a downwardly and inwardly inclined surface adapted to be juxtaposed to a portion of the conveying means to aid the circulatory air movement.

7. A drying tunnel comprising means for conveying ware therethrough, air inlet means disposed along the tunnel, said means being arranged to permit the air to flow transversely along the top of the tunnel, the wall of the tunnel between its top and side being inclined to aid a stream-line circulatory movement of the air, and downwardly and inwardly inclined surfaces at opposite sides of the tunnel adapted to be juxtaposed to a portion of the conveying means to aid the circulatory air movement.

8. A drying tunnel comprising means for conveying ware therethrough, air inlet means disposed along the tunnel, said means being arranged to permit the air to flow transversely along the top of the tunnel, the wall of the tunnel between its top and side being inclined to aid a stream-line circulatory movement of the air, downwardly and inwardly inclined surfaces at opposite sides of the tunnel adapted to be juxtaposed to a portion of the conveying means to aid the circulatory air movement, and inclined baffles projecting into the tunnel and adapted to have the inner ends spaced from the ware, to deflect a portion of the air toward the intermediate portion of the same.

9. A drying tunnel comprising parallel tunnel portions, means for conveying ware therethrough, a source of drying air supply, a drying air duct extending along the tunnel and air inlets admitting drying air from the duct to the adjacent sides of the tunnel portions, branches of said duct extending along adjoining sections of the tunnel portions and air inlets admitting drying air from said branches to the opposed sides of said last-named sections, whereby transverse air movement occurs in opposite directions in adjoining sections of the parallel tunnel portions.

10. The method of drying ceramic ware, which comprises passing the ware through successive drying zones, and rotating currents of heated air under pressure in opposite directions in successive zones about the ware, with the axis of rotation of the air current substantially intersecting the ware.

11. The method of drying ceramic ware, which comprises passing the ware through successive drying zones, and rotating currents of heated air in opposite directions in successive zones about the ware with the axis of rotation of the air current substantially intersecting the ware, while removing a quantity of moisture-laden air from the air current rotating about the ware and adding a mixture of dry heated air and moisture-laden air to the rotating current, and making the amount of moisture in the added air mixture smaller in the latter drying zones.

12. A drying tunnel comprising means for conveying ware therethrough, air inlet means disposed along the tunnel and arranged to direct air into the tunnel along a narrow longitudinal portion thereof adjoining one wall thereof, the walls of the tunnel being arranged to cooperate with the inlet means to set up a rotary air current, the conveyor means being arranged to hold ware so that the axis of rotation of the air current is in the region of the ware.

13. A drying tunnel comprising means for conveying ware therethrough, air inlet means disposed along the tunnel and arranged to direct air into the tunnel along a narrow longitudinal portion thereof adjoining one wall thereof, the walls of the tunnel being arranged to cooperate with the inlet means to set up a rotary air current, the conveyor means being arranged to hold ware so that the axis of rotation of the air current is in the region of the ware, and inwardly projecting baffles to divert a portion of the air from its rotary movement toward the portion of the ware adjoining said axis of rotation.

14. A drying tunnel comprising means for conveying ware therethrough, air inlet means disposed along the tunnel and arranged to direct air into the tunnel along a narrow longitudinal portion thereof adjoining one wall thereof, the walls of the tunnel being arranged to cooperate with the inlet means to set up a rotary air current, the conveyor means being arranged to hold ware so that the axis of rotation of the air current is in the region of the ware, and yieldably mounted air relief drafts arranged to cause the air pressure within the tunnel to build up to a predetermined amount.

15. A drying tunnel comprising means for conveying ware longitudinally therethrough, longitudinally disposed air inlets and longitudinally disposed air outlets arranged to set up a rotary air current in the tunnel with the axis of rotation of the current intersecting the region of the ware, and longitudinally disposed baffles projecting into the tunnel and arranged to divert a portion of the rotating air current into the region of said axis of rotation.

16. A drying tunnel comprising means for conveying ware therethrough, a plurality of means for supplying drying air thereto, moist air outlets in the tunnel, said means being arranged to circulate the air in opposite transverse directions in successive zones of the tunnel, ducts to mix moisture-laden air from the outlets with incoming drying air, said ducts being arranged to supply exhausted, moisture-laden air from each portion of the tunnel to the means supplying drying air to substantially the same portion of the tunnel, whereby, as the ware is progressively dried, the moisture content of the air in the later drying sections tends to be smaller.

Signed by me at Elizabeth, New Jersey, this 14th day of March, 1927.

CLARENCE L. COLBERT.